United States Patent
Baarsch et al.

(10) Patent No.: US 9,138,121 B2
(45) Date of Patent: Sep. 22, 2015

(54) SCRAPER ATTACHMENT FOR SPONGES

(76) Inventors: Byron Keith Baarsch, Lebanon, OR (US); Jennette Baarsch, Lebanon, OR (US)

(*) Notice: Subject to any disclaimer, the term of this patent is extended or adjusted under 35 U.S.C. 154(b) by 861 days.

(21) Appl. No.: 13/413,658

(22) Filed: Mar. 7, 2012

(65) Prior Publication Data

US 2013/0233345 A1    Sep. 12, 2013

(51) Int. Cl.
| | |
|---|---|
| A47L 13/022 | (2006.01) |
| A47L 13/03 | (2006.01) |
| A47L 13/12 | (2006.01) |
| A47L 13/16 | (2006.01) |
| B08B 1/00 | (2006.01) |
| B29C 45/00 | (2006.01) |
| B29C 45/14 | (2006.01) |
| B29L 31/00 | (2006.01) |

(52) U.S. Cl.
CPC ............... *A47L 13/03* (2013.01); *A47L 13/022* (2013.01); *A47L 13/12* (2013.01); *A47L 13/16* (2013.01); *B08B 1/00* (2013.01); *B08B 1/005* (2013.01); *B29C 45/00* (2013.01); *B29C 45/14* (2013.01); *B29L 2031/7406* (2013.01)

(58) Field of Classification Search
None
See application file for complete search history.

(56) References Cited

U.S. PATENT DOCUMENTS

| | | | | |
|---|---|---|---|---|
| 4,893,369 A * | 1/1990 | Johnson | ....................... | 15/119.2 |
| 6,385,807 B1 * | 5/2002 | Pinochi | ....................... | 15/119.2 |
| 6,389,635 B1 * | 5/2002 | Petner et al. | ................. | 15/119.2 |
| 2007/0231054 A1 * | 10/2007 | Wales | ........................... | 401/280 |
| 2008/0216260 A1 * | 9/2008 | Silverman et al. | .............. | 15/105 |
| 2010/0088839 A1 * | 4/2010 | Georgieff | ..................... | 15/244.2 |

* cited by examiner

*Primary Examiner* — Nicole Blan
(74) *Attorney, Agent, or Firm* — Patent Ingenius LLC; Scott Evan Gilbert

(57) ABSTRACT

A scraper attachment for mounting onto sponges used in cleaning applications is described. The inventive attachment comprises a leading scraping edge, a serrated raised edge, a debris catch, finger grips and side flaps formed integrally as a single piece of material. A support rod integral a side flap of the inventive scraper attachment is pierced through the body of a sponge for securely mounting the inventive attachment on a sponge to by fastening to the opposite side flap. The inventive scraper attachment can be easily dismounted from the sponge for reuse and cleaning, and be used independently with any brand of sponge. The serrated raised edge serves to help break up stubborn deposits, while the debris catch collects the loosened material for convenient cleaning. Additionally, a liquid soap or detergent dispensing means is included to infuse liquid soap or detergent into the sponge.

19 Claims, 4 Drawing Sheets

SCRAPER ATTACHMENT FOR SPONGES

FIELD OF THE INVENTION

This invention relates to cleaning attachments, in particular, scraping attachments, for mounting on hand-held sponges used in both household and industrial cleaning applications, as an aid for the removal of unintended surface deposits and films proving difficult or impossible for the sponge alone to remove.

BACKGROUND

Sponges have been used for many years as a tool for cleaning cookware, utensils, kitchen and bathroom surfaces, automobile surfaces, windows, floors, furniture and a myriad of other objects and surfaces. Synthetic sponges, first developed by DuPont in 1940, have since largely replaced authentic sea sponges for household and industrial use.

Sponges are used because they are absorbent, reusable, and lightweight. However, a primary disadvantage of sponges is that by themselves, sponges are too soft and pliable to scrape away unwanted substances such as dirt, hardened oils or grease, mildew, waxes or foods that stick and adhere to surfaces and reside in corners, grooves and crevices. Abrasive layers do not effectively allow users to remove substances residing in tight corners, grooves and crevices because neither the sponge nor the abrasive layer provide a rigid enough edge, to enable users to impart the requisite forces necessary for scraping and removing unwanted substances from the tight locations and, in some cases, from flat surfaces as well.

Several types of sponge/scraper implements have been proposed. For example, in U.S. Patent Application No. 2008/0216260 to Silverman et al., an integrated scraper and sponge device is disclosed. While this invention is an improvement upon the use of a sponge alone for removal of difficult and persistent deposits or films, it has several disadvantages. Namely, the disclosed scraper design does not allow for easy grasp and use of the scraper without the sponge. Moreover, the pliable nature of the sponge make grasping the scraper portion all the more difficult for simple and effective removal of unwanted materials. The scraper portion does not include a serrated edge for breaking up stubborn material before scraping, making the use of the device more difficult and less effective than intended. The attachment of the scraper portion to the sponge portion precludes use of the total sponge surface area, making the use of this device inconvenient. Finally, the integral nature of the device only allows for limited reuse, being not removable as a separate unit by the consumer, necessarily to be discarded when the sponge discarded.

U.S. Pat. No. 7,984,527 to Georgieff discloses a scraper attachment for sponges that employs a large handle, attachable to the top surface of a sponge, for facile control of the sponge and ergonomic application of hand pressure for effective scraper action. While this device in an improvement over a sponge alone, its design is bulky, and makes access to tight areas difficult if not impossible. The scraper portion of the device does not include a serrated edge, and moreover the application of the device precludes complete use of the sponge surface area. As with the previous disclosure, this device only works with one type of sponge. Other examples include U.S. Pat. No. 4,724,568 to Englehardt, describing a scraper formed integrally with a sponge pad.

The consumer is faced with few choices of such devices that are currently available on the market, and further rebuffed by the limitations of such devices that have been disclosed above. Proctor and Gamble Company currently has at least two integrated sponge/scraper combination products on the market, distributed by Butler Home Products LLC. These products are largely not reusable, difficult to hold, and one of these products completely covers the top surface of the sponge, reducing the usable area of the sponge. A device offering total flexibility to be used on any brand of standard kitchen sponge, or sponges intended for other uses, for all cleaning applications is currently not available on the market. Furthermore, the consumer cannot find an attachment that is lightweight, easily grasped and allows for reuse of the scraper independent of the life of the sponge, and transferable to any other sponge of similar size.

BRIEF DESCRIPTION

The present invention addresses the deficiencies enumerated in the foregoing discussion, whereby the invention is a scraper attachment that is mountable on sponges and removable therefrom, that has the qualities of being lightweight, ergonomic, yet small so as not to restrict the sponge's access to encumbered surfaces. In addition, the invention is reusable with any sponge of similar size.

In the preferred embodiment of the invention, which includes a top surface, bottom surface and two side flaps, a serrated scraping edge is disposed in the front portion of the top surface of the scraper attachment to facilitate removal of hardened and/or persistent deposits or films, a debris catch disposed behind the scraping edge for collection of loosened debris, a concave and/or dimpled or otherwise textured surface disposed behind the debris catch as well as on each side flap of the scraper attachment for easy grip and maneuverability. Additionally, the preferred embodiment comprises one or more support bars or rods that are affixed to the interior face of one of either side flap for piercing entirely through the body of the sponge to penetrate through to the opposite side, whereby the protruding tip of the bar is secured by a clasping or clip fastener integral with the interior face of the opposite side flap. In this manner, the inventive scraper attachment can be securely but reversibly affixed on the body of the sponge, allowing facile hand manipulation of the sponge, while at the same time providing a rigid and ergonomic scraping tool for enhanced cleaning of surfaces or objects. In a second embodiment described, a soap reservoir for containing liquid soaps or detergents is included, having a dispensing tube attached to modified support bars that have a hollow center and a plurality of apertures disposed along the shaft through which liquid soaps or detergents can be infused into the interior of the body of the attached sponge by simple squeezing of the soap reservoir.

DETAILED DESCRIPTION OF THE EMBODIMENTS

The present invention is directed to a scraper attachment adapted for scraping and removing unwanted substances such as dirt, hardened oils and grease, mildew, waxes, stuck-on foods, or like substances that adhere to surfaces and reside in corners, grooves holes and crevices.

Figure 1A:
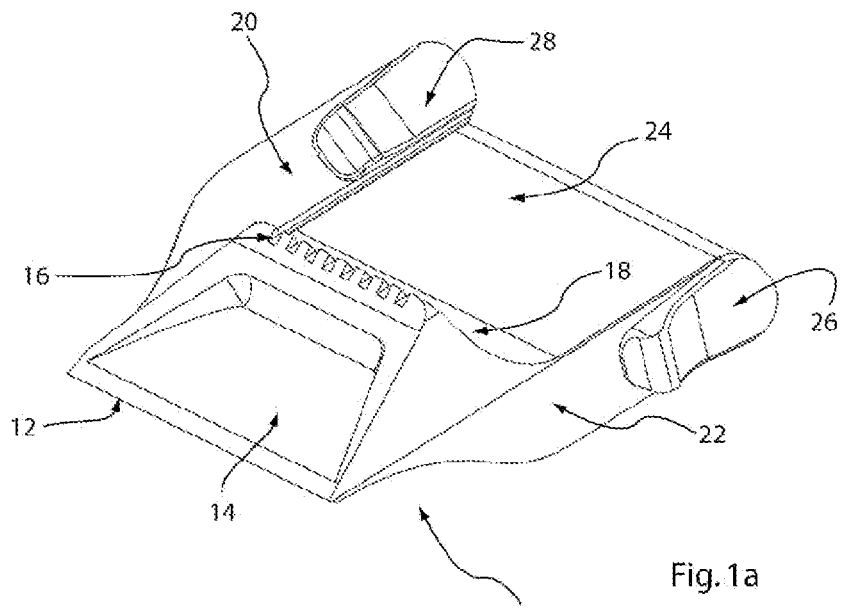
FIG. 1a. Isometric top view of the invention.

Referring to FIG. 1a, a top view of the inventive scraper attachment is shown. The planar main body 10 of the inventive scraper attachment comprises, smooth tip portion that coincides with the leading edge 12 of the scraper attachment extending outwardly and defining at least one edge and a depressible surface to which forces are applied to manipulate the scraper. A debris catch 14 is disposed behind the leading edge of the scraper attachment, and comprises a concavely contoured surface that serves for the collection of scraped materials to build up within it for easier disposal. In one embodiment, debris catch 14 comprises a concavely sloping surface, sweeping up from leading edge 12 to terminate at a raised edge 16 that rises out of the plane of the main body. In the particular embodiment depicted in FIG. 1a, raised edge 16 forms a arc-shaped crest extending over the plane of the main body 10 from one side to the other. However, it is understood that the embodiment depicted in FIG. 1a is illustrative, and other geometrical shapes of debris catch 14 and raised edge 16 are conceivable. In the preferred embodiment, raised edge 16 is serrated for more effective scraping action, and is useful for particularly stubborn deposits.

The serrated raised edge 16 has less contact area than a smooth edge, therefore any applied force is greater at each tooth of the serration than the average force applied. The sharp angles of the tooth edges provide a cutting action when the scraper is thrust forward; typical scraping action involves a back-and-forth motion or circular motion wherein the forward component of the movement provides the scraping action. The cutting action of the serrated edge involves many small splits in the surface of the material being cut, which cumulatively serve to cut the material along the line of the serrated edge. Once the material is broken up in such a manner there are fewer points of resistance, subsequently less force is needed to fully remove unwanted material by means of the leading edge of the inventive scraper attachment.

Front finger grip 18 is disposed behind the raised edge 16 and is provided to receive at least a portion of a human finger tip, or multiple human finger tips. Front finger grip 18 acts as a stable point from which to gain leverage for the forward and reverse movement/scraping action and may have dimples, ripples, indentations or other such imprints for making gripping the surface easier.

Figure 1B:
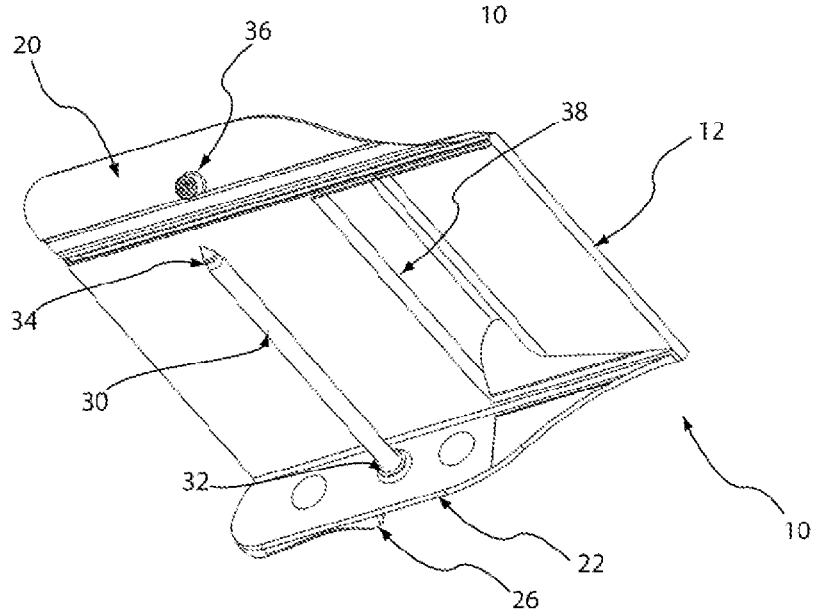
FIG. 1b. Isometric bottom view of the invention.

Side flaps 20 and 22 are joined to and hingedly articulate with the rear portion 24 of the main body 10 of the inventive scraper attachment by means of bendable edges joining the side flaps 20 and 22 and the main scraper body 10. Side flaps 20 and 22 are normally folded at a substantially perpendicular angle to the plane of the main scraper body to gird and secure the sponge (see below). In FIGS. 1a and 1b, side flap 20 is shown in partially unfolded position. Side finger grips 26 and 28 are respectively disposed substantially towards the rear portion of the outer surfaces of side flaps 20 and 22. Both of the side finger grips 26 and 28 are contoured for receiving at least a portion of a human fingertip, or multiple fingertips. The two side finger grips act together as stable points from which to obtain a firm and stable grasp allowing energy to be exerted toward leverage during scraping rather than toward stabilizing the sponge body.

Referring now to FIG. 1b, support bar/rod 30 is integrally affixed on the inner surface of side flap 20 at its proximal end 32. When side flaps 20 and 22 are folded at substantially a 90° angle to the plane of main scraper body 10, support bar/rod 30 extends from the inner surface of side flap 20 to the inner surface of side flap 22, where it is met by a engaging means for securely fastening the distal end of bar/rod 30 to side flap 22. The axis of support bar/rod 30 is substantially parallel to leading edge 12 and the plane of the main scraper body 10. In this disposition, support bar/rod 30 functions as a truss to form a structurally sturdy attachment that girds a sponge. The distal end 34 of support bar/rod 30 is tapered, and can take on, but not be limited to, a stylus shape, while the body of support bar/rod is substantially smooth for facile piercing of and penetration through the body of the sponge, preferably through the width dimension, to secure it to the attachment (see below). The cross section of the body of support bar/rod 30 can range from cylindrical, as in the preferred embodiment, to a flat, blade-like shape.

The support bar/rod receiving means 36 is integral with side flap 20 and can take on the form of a clip having a depression for insertion of the distal end henceforth referred to as the tip 34 of support bar/rod 30. Receiving means 36 can also attach by means of a latch or hook and latch mechanism. In the preferred embodiment, receiving means 36 can be a molded plastic part formed with the scraper body as a single piece by plastic injection molding, or can be a separately formed from (but not limited to) rubber, plastic, composite, metal or any combination thereof.

Sponge stop 38 is a plastic plate located in front of the support bar/rod and is used as a guide for proper placement of the sponge on the scraper attachment. Sponge stop 38 also acts as a second solid point to hold the sponge in place.

The inventive scraper attachment has the ability to be attached to a sponge or any surface that is appropriate for its purpose of cleaning, scrubbing and removing any unwanted substance from any surface.

Figure 2A:
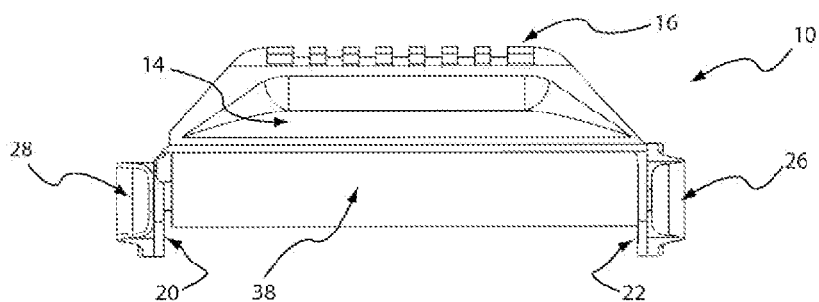
FIG. 2a. Front view of the invention.
Figure 2B:
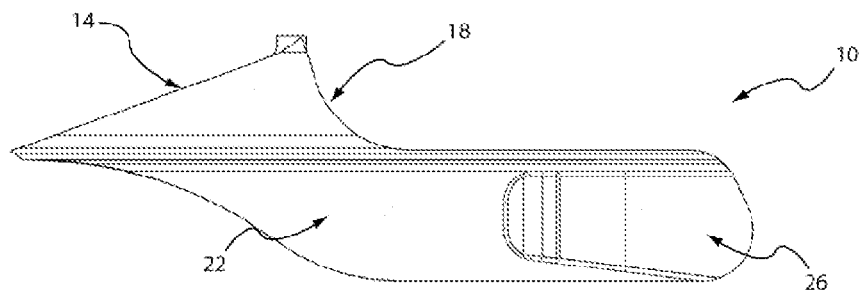
FIG. 2b Side view of the invention.
Figure 2C:
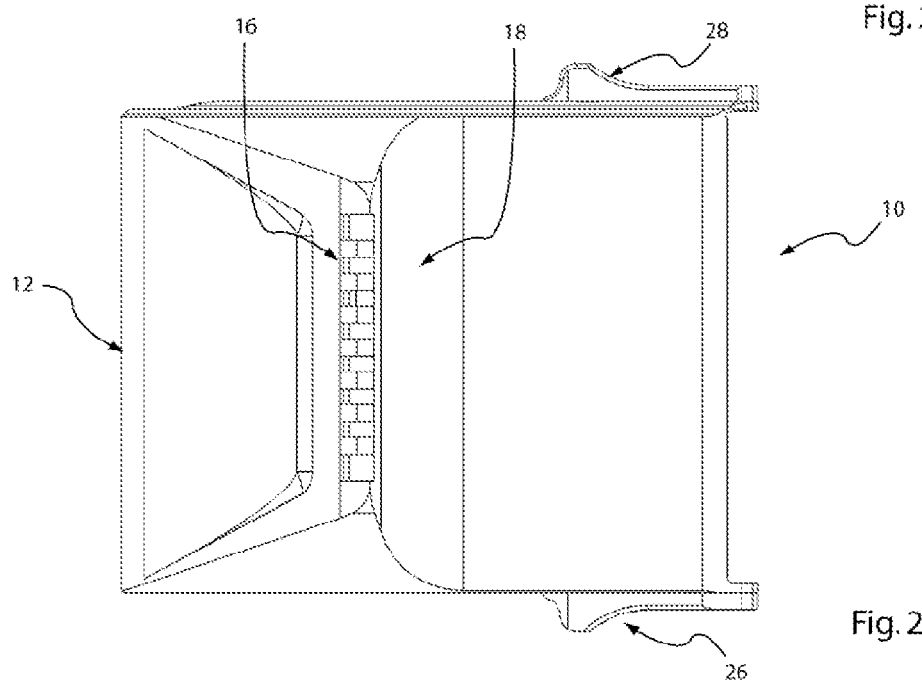
FIG. 2c. Top plan view of the invention.

In FIG. 2a, a frontal view of the inventive scraper attachment 10 is shown to provide a view of the relief of the side grips 26 and 28 disposed on the outer portions of side flaps 20 and 22 bent at 90° angles with respect to the plane of the main scraper body. Debris catch 14 is also shown in greater detail delineated by the arc-shaped raised serrated edge 16. FIG. 2b shows a side view of the inventive scraper attachment 10 with side flap 20 in the clipped 90° angle configuration. FIG. 2c provides a top view of the inventive scraper body 10, featuring a full view of the front finger grip 18.

Figure 3:
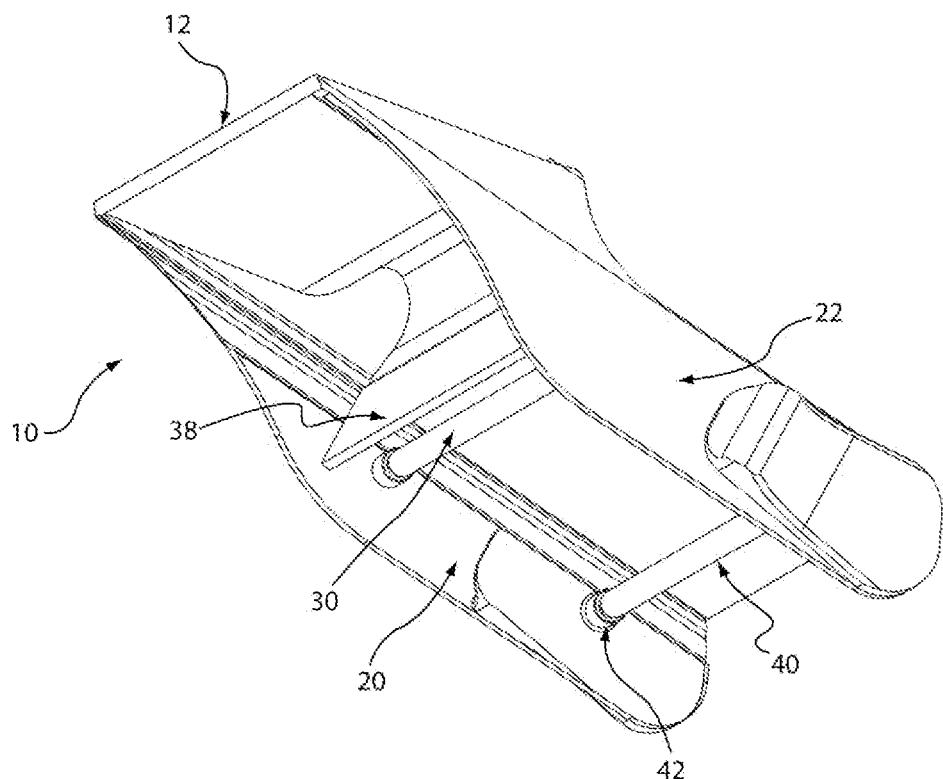
FIG. 3. Second embodiment of the invention, bottom angled view detailing a second support bar.

In FIG. 3, a further embodiment of the invention is shown, a second support bar/rod 40 is affixed to side flap 20 in proximity to first support bar/rod 30, and a second receiving means 42 is disposed on the inner surface of slide flap 22 in the proximity of first receiving means 36. Support bar/rod 40 can be identical in shape and dimensions to bar/rod 30, but also can have a different shape, diameter, taper, material and other characteristics than first support bar/rod 30. As an example, second support bar/rod 40 can have a smaller diameter than first support bar/rod 30, and/or have a more tapered profile. The same is equally applies to second receiving means 42, whereby second receiving means 42 can be identical to first receiving means 36, but can also embody a different design and/or type than first receiving means 36. For example, second receiving means 42 can embody a clip that is smaller relative to first receiving means 36, to accommodate, for example, a narrower second support bar/rod tip.

Figure 4:
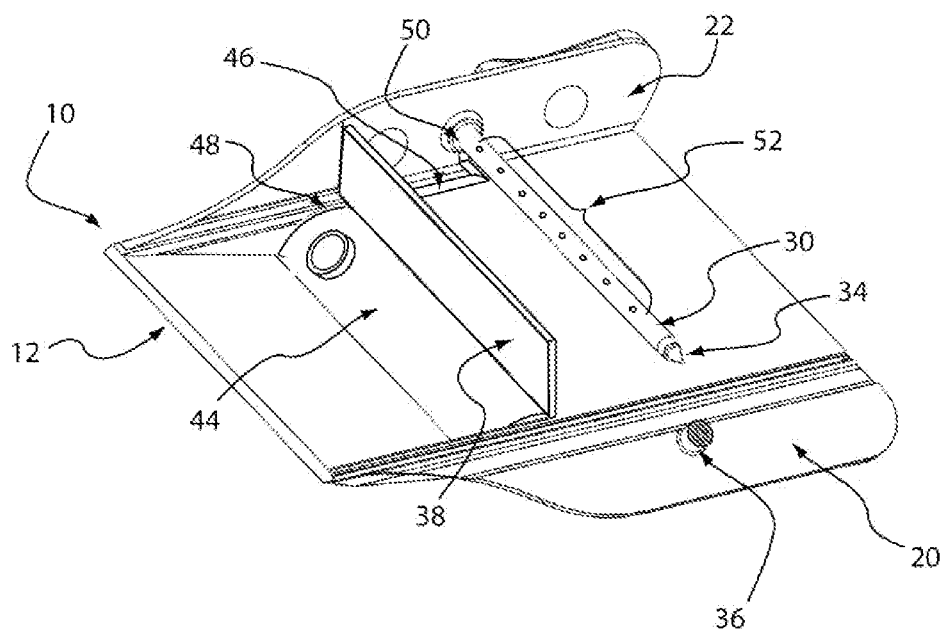
FIG. 4. Third embodiment of the invention, bottom angled view detailing a soap reservoir, dispensing tube and perforated support bar for dispensing soap within the body of a sponge, integral with the body of the inventive scraper attachment.

In FIG. 4, a further embodiment of the invention is shown, wherein a soap dispensing means comprising a soap reservoir 44 for containing liquid soap, and dispensing tube 46 to transfer liquid soap to one or both of the support bar/rods 30 and 40 is included. Soap dispensing reservoir 44 further comprises a semi-rigid hollow sac, container or vessel of appropriate dimensions, preferably of molded deformable plastic material, and can be substantially rectangular, cylindrical, spherical, or take on a combination of shapes to form a suitable structure that can be integrated with the main scraper body 10. In the preferred embodiment, soap reservoir 44 is affixed to main scraper body 10, preferably integrally formed with the bottom surface, and preferably disposed between the front edge 12 of the main scraper body 10 and sponge stop 38. However, soap reservoir 44 can also be disposed along the top surface of main scraper body 10, for example along rear portion 24. Dispensing tube 46, having a first end 48 and a second end 50, is integral to and in fluidic communication with soap reservoir 44 at the first end 48. Dispensing tube 46 may be formed integrally with the main scraper body 10. The second end 50 of dispensing tube 46 is attached to at least one of support bar/rods 30 and/or 40. In this embodiment, support bar/rods 30 and/or 40 have a hollow center and possess a plurality of dispensing apertures 52 disposed on the shaft portion, through which liquid soap can be infused into the sponge body. Soap reservoir 44 and dispensing tube 46 are preferably made from, but not limited to, a deformable molded plastic material, preferably integrally formed by injection molding with the main scraper body 10. Dispensing tube 46 can be disposed along the junction between the plane of main scraper body 10 on its top or bottom, and be partially disposed along one of the two side flaps 20 and 22 wherein first end of support bar 32 is attached to form a fluid connection with support bar 30.

Figure 5:
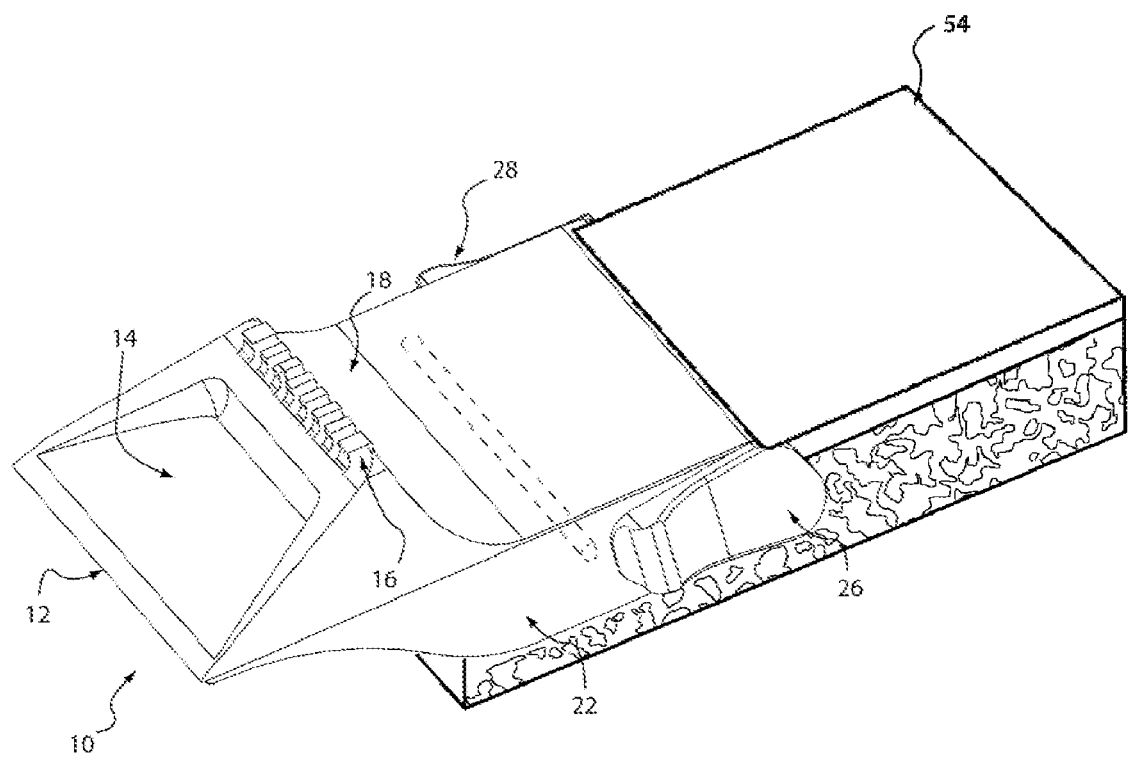
FIG. 5. Demonstrational view of the invention mounted on a sponge.

Finally, the inventive scraper attachment 10 is shown fixedly secured to a sponge in FIG. 5. Hidden lines depict the support bar/rod embedded in the body of the sponge when the attachment 10 is mounted on the sponge and support bar/rod 30 is secured by receiving means 36. The method of conjoining the sponge and scraper attachment may be accomplished by means of piercing the sponge with the support bar/rod 30 and securing it to receiving means 36. This process is simple and may be done by the user with ease. The user does not have to glue or reattach the scraper in any strenuous manner; therefore the sponge will not be damaged. All surfaces of the sponge can be utilized. The sponge being made from a pliable and manipulative material is able to accept the support bar and assume its natural shape and ability to perform as usual. The scraper attachment may be made from numerous materials such as natural rubber, synthetic rubber, plastics, polymers, wood, metal or any combination thereof. The scraper attachment is not limited in the regard, and any appropriate scraper material that is currently known or later becomes used. For improved manipulation and scraping, the depressible surface 18 (FIG. 1*a*) is contoured in a concave-like manner and, depending on the size, is adapted for receiving at least a portion of: (I) a human fingertip, (II) multiple human fingertips, (III) a human hand or (IV) two human hands, for applying pressure and manipulating the scraper.

Having thus described the scraper attachment, attention will now be drawn to an example of its use.

With the scraper attachment fixedly secured onto any household sponge, and/or the desired object or surface for cleaning prepared with soap, cleaning liquids, cleaning powders or the like, the user places the sponge body in contact with said object or surface. The user then presses on the contoured depressible surface 14 (FIG. 1*a*) thereby imparting downward pressure on the scraper edge 12 (FIG. 1*a*).

The serrated edge 16 (FIG. 1*a*) is an additional feature that allows for added ease in removing stubborn material. In another embodiment, liquid soaps or detergents can be infused into the interior of the body of the attached sponge by squeezing action on soap reservoir 44 to force liquid soap or detergent from soap reservoir 44 into the hollow center of one or more support bar/rods 30 and 40, and out into the sponge interior through the plurality of dispensing apertures 52.

With pressure applied, the scraper attachment is moved into position for contacting and scraping unwanted substances in a desired location. While maintaining the applied pressure, the user can grasp onto the provided finger grips provided by front finger grip(s) 18, and side finger grips 26 and 28 (FIGS. 1*a* and 1*b*) and scrape stubborn material off in, for example, a forward or reciprocating motion to effectively scrape away and remove the unwanted substance. When finished, the scraper attachment may be easily removed by simply unfastening support bar/rod 30 (FIG. 1*b*) and pulling it out of the sponge body. No glues or adhesives are involved. Both the sponge and scraper may be washed and sanitized for reuse. Further, the scraper attachment can be used in a dry state without the addition of water, soap, cleaning liquids, cleaning powders, or the like.

The inventive scraper attachment may be used in a variety of applications that may dictate the size, shape and configuration of the size of the attachment. For example, small size scraper attachments may be used to clean pots, pans and small containers, while larger scraper attachments can be used to clean larger surfaces or objects, such as automobiles. Furthermore, specific shapes and configurations may be implemented for use in specific environments such as, for example, car interiors and exteriors, sinks, stoves, bathtubs, toilets, windows, furniture, and countless other applications where sponges can be used for cleaning.

In view of the embodiments disclosed above and their various aspects, it will be appreciated that the detailed description of the various embodiments are illustrative only and are by no means to be construed as limiting the scope and spirit of the invention. Rather, we claim as our invention all such embodiments as may come within the scope and spirit of the invention as expressed in the claims that follow, and equivalents thereto.

The invention claimed is:

1. A scraper attachment for a sponge, comprising:
   (i) a main body adapted to be removably affixed to a body of a sponge, said main body comprising a top surface and a bottom surface, front and rear edges, the front edge adapted to scrape material from a surface, a first side edge and a second side edge, a first flap hingedly affixed to the first side edge and a second flap hingedly affixed to the second side edge and thereby bendably articulate with the main body, each flap having an outer surface and an inner surface;
   (ii) least one elongate rod for piercing and penetrating through both sides of the body of the sponge to securely affix the scraper attachment to the sponge, said at least one elongate rod having a proximal end and a distal end, the proximal end affixed to the inner surface of the first flap in such a way that the at least one elongate rod extends from the inner surface of the first side flap to the inner surface of the second side flap when both the first and second side flaps are bent to form substantially right angles with the bottom surface of the main body such that the sponge is partially enclosed by said scraper attachment; and
   (iii) at least one receiving means disposed on the inner surface of the second flap, said receiving means adapted to receive the distal end of the at least one elongate rod in such a way so as to form a fixed configuration of the side flaps bent with respect to the bottom surface plane.

2. The scraper attachment of claim 1, wherein at least one of the at least one elongate rod comprises a hollow center, and apertures disposed along a body of the at least one of the at least one elongate rod, said apertures extending from an exterior surface the at least one of the at least one elongate rod to the hollow center, in such a way that the hollow center is in communication with the exterior surface of the at least one of the at least one elongate rod.

3. The scraper attachment of claim 2, further comprising a soap reservoir for containing a liquid soap, said soap reservoir affixed to the main scraper body of said scraper attachment, whereby a dispensing tube having a first end connected to and in fluidic communication with the soap reservoir and a second end connected to and in fluidic communication with the hollow center of the at least one of the at least one elongate rod.

4. The scraper attachment of claim 3, wherein said soap reservoir is disposed along the bottom surface of the main body.

5. The scraper attachment of claim 3, wherein said soap reservoir is disposed along the top surface of the main body.

6. The scraper attachment of claim 1, further comprising a retaining wall disposed along the bottom surface of the main body of said scraper attachment and extending perpendicularly therefrom, said retaining wall extending between both side edges and substantially perpendicular thereto, being disposed substantially forward of the at least one elongate rod, the retaining wall being adapted to perform as an alignment aid for attaching said scraper attachment to a sponge.

7. The scraper attachment of claim 1, wherein the top surface of the main body comprises a raised surface section and extending above the top surface of the main body and disposed along said top surface rearward of the front edge, said raised surface section having a serrated front edge and a depressible portion extending rearward of the serrated front edge.

8. The scraper attachment of claim 7, wherein the raised surface section extends forward to the front edge of the main body of said scraper attachment, forming a concave slope between the front edge of the main body of said scraper attachment and the serrated front edge of the raised surface section whereby the concave slope descends towards the front edge of the main body of said scraper attachment.

9. The scraper attachment of claim 7, wherein the raised surface section forms an abrupt angle with the top surface of the main body of said scraper attachment.

10. The scraper attachment of claim 4, wherein at least part of the depressible portion of the raised surface section is contoured to form one or more depressions for receiving one or more human fingertips.

11. The scraper attachment of claim 7, wherein the depressible portion of the raised surface section is contoured to receive a human hand.

12. The scraper attachment of claim 1, wherein the at least one elongate rod has a cylindrical rod shape, whereby the distal end of the at least one elongate rod is tapered to form a stylus tip.

13. The scraper attachment of claim 1, wherein the at least one elongate rod is manufactured from a polymer, wood or metal.

14. The scraper attachment of claim 1, wherein the at least one elongate rod comprises two elongate rods.

15. The scraper attachment of claim 1, wherein the at least one receiving means disposed on the inner surface of the second flap is selected from the group consisting of a clip, a latch and a hook.

16. The scraper attachment of claim 1, wherein the scraper attachment is integrally manufactured by injection molding or embossing of a thermoplastic material.

17. A method of using a scraper attachment, comprising the steps of:
(i) Providing a scraper attachment, comprising:
(a) a main body adapted to be removably affixed to a body of a sponge, said main body comprising a top surface and a bottom surface, front and rear edges, the front edge adapted to scrape material from a surface, a first side edge and a second side edge disposed substantially perpendicular to the front and rear edges, a first flap hingedly affixed to the first side edge and a second flap hingedly affixed to the second side edge, both the first flap and the second flap thereby being bendably articulate with the main body, each flap having an outer surface and an inner surface;
(b) a raised surface section integral with the main body of said scraper attachment and extending above the top surface of the main body and disposed along said top surface rearward of the front edge, said raised surface section having a serrated front edge and a depressible portion extending rearward of the serrated front edge, the depressible portion having one or more top finger grips;
(c) one or more side finger grips disposed on the outer surface of each of said flaps;
(d) at least one elongate rod for piercing and penetrating through both sides of the body of the sponge to securely affix the scraper to the sponge, said at least one elongate rod having a proximal end and a distal end, the proximal end affixed to the inner surface the first flap in such a way that the axis of the at least one elongate rod extends from the inner surface of the first side flap to the inner surface of the second side flap when both side flaps are bent to form substantially right angles with the bottom surface of the main body of said scraper attachment, at least one of the at least one elongate rod comprising a hollow center and a plurality of apertures disposed along the at least one of the at least one elongate rod extending from the surface of the at least one of the at least one elongate rod to the hollow center;
(e) at least one receiving means disposed on the inner surface of the second flap, said at least one receiving means adapted to receive the distal end of the at least one elongate rod and securely fastening the distal end of the at least one elongate rod to the inner surface of said second flap in such a way that the side flaps are bent at substantially right angles with respect to the bottom surface of the main body; and
(f) a deformable soap reservoir affixed to the bottom surface of the main body of said scraper attachment, and in fluidic communication with the hollow center of the at least one elongate rod having the hollow center such that a liquid soap is dispensed into the body of said sponge through said plurality of apertures disposed along the at least one of the at least one of the elongate rod when the deformable soap reservoir is deformed;
(ii) providing a sponge;
(iii) aligning a front edge of the sponge to the front edge disposed on the bottom surface of the main body;
(iv) piercing one side of the sponge and penetrating therethrough with the at least one elongate rod to extend through the opposite side of said sponge;

(v) bending both of the side flaps to form substantially right angles to the bottom surface of the main body of said scraper attachment, whereby the bottom surface of the main body is parallel to and in intimate contact with a top surface of the sponge;

(vi) securely fastening the proximal end of the at least one elongate rod to the at least one receiving means, thereby affixing the scraper attachment securely to the sponge;

(vii) grasping the scraper attachment with one hand by engaging the one or more top finger grips with at least one digit and engaging the at least one or more side finger grips with at least one of the remaining digits of the one hand on each side flap;

(viii) contacting the body of the sponge with a cleanable surface and applying pressure to the depressible portion and imparting downward pressure on the front edge of the main body; and (ix) moving the scraper attachment to a desired location on the cleanable surface, then moving the scraper attachment in a forward or reciprocal motion to scrape away an unwanted substance.

18. The method of claim 17, further comprising a step of deforming the deformable soap reservoir to dispense the liquid soap into the body of the sponge through the plurality of apertures disposed along the at least one of the at least one elongate rod.

19. A scraper attachment for a sponge, comprising:
(i) a main body adapted to be removably affixed to a body of a sponge, said main body comprising a top surface and a bottom surface, front and rear edges, the front edge adapted to scrape material from a surface, a first side edge and a second side edge disposed substantially perpendicular to the front and rear edges, a first flap hingedly affixed to the first side edge and a second flap hingedly affixed to the second side edge, both the first flap and the second flap thereby being bendably articulate with the main body, each flap having an outer surface and an inner surface;
(ii) A raised surface section integral with the main body and extending above the top surface of the main body and disposed along said top surface rearward of the front edge, said raised surface section having a serrated front edge and a depressible portion extending rearward of the serrated front edge;
(iii) at least one finger grip disposed on the outer surface of each of said flaps, the at least one finger grip being of sufficient size to receive at least a portion of a human fingertip;
(iv) at least one elongate rod for piercing and penetrating through both sides of the body of the sponge to securely affix the scraper attachment to the sponge, said at least one elongate rod having a proximal end and a distal end, the proximal end affixed to the inner surface the first flap in such a way that an axis of the at least one elongate rod extends from the inner surface of the first flap to the inner surface of the second flap when both flaps are bent to form substantially right angles with the bottom surface of the main body of said scraper attachment, at least one of the at least one elongate rod comprising a hollow center and a plurality of apertures disposed along the at least one of the at least one elongate rod extending from the surface of the at least one of the at least one elongate rod to the hollow center;
(v) at least one receiving means disposed on the inner surface of the second flap, said receiving means adapted to receive the distal end of the at least one elongate rod and securely fastening the distal end of the at least one elongate rod to the inner surface of said second flap in such a way that the flaps are bent at substantially right angles with respect to the bottom surface of the main body; and
(vi) a soap reservoir affixed to the bottom surface of the main body of said scraper attachment, said soap reservoir adapted to dispense a liquid soap when squeezed, and in fluidic communication with the hollow center of the at least one elongate rod having a hollow center such that the liquid soap is dispensed into the body of said sponge through said plurality of apertures disposed along the at least one elongate rod.

\* \* \* \* \*